(12) United States Patent
Bagshaw et al.

(10) Patent No.: US 7,894,306 B2
(45) Date of Patent: Feb. 22, 2011

(54) APPARATUS AND METHOD FOR DATA TRANSFER THROUGH A SUBSTRATE

(75) Inventors: John Martin Bagshaw, Chelmsford (GB); Lionel William Kent, Chelmsford (GB)

(73) Assignee: BAE Systems plc, London (GB)

( * ) Notice: Subject to any disclaimer, the term of this patent is extended or adjusted under 35 U.S.C. 154(b) by 329 days.

(21) Appl. No.: 11/992,201

(22) PCT Filed: Nov. 27, 2007

(86) PCT No.: PCT/GB2007/050720

§ 371 (c)(1),
(2), (4) Date: Mar. 17, 2008

(87) PCT Pub. No.: WO2008/075092

PCT Pub. Date: Jun. 26, 2008

(65) Prior Publication Data

US 2010/0061188 A1  Mar. 11, 2010

(30) Foreign Application Priority Data

Dec. 21, 2006 (EP) .................................. 06256460
Dec. 21, 2006 (GB) .................................. 0625559.0

(51) Int. Cl.
*H04B 11/00* (2006.01)
(52) U.S. Cl. ..................................................... 367/137
(58) Field of Classification Search ................. 367/134, 367/137
See application file for complete search history.

(56) References Cited

U.S. PATENT DOCUMENTS 4,050,056 A    9/1977  Massa (Continued)

FOREIGN PATENT DOCUMENTS

EP        0231892         5/2002

(Continued)

OTHER PUBLICATIONS

U.K. Patent Office, Search Report, Aug. 8, 2007, from related UK Patent Application No. GB 0625559.0, filed Dec. 21, 2006.

(Continued)

*Primary Examiner*—Dan Pihulic
(74) *Attorney, Agent, or Firm*—Kenyon & Kenyon, LLP

(57) ABSTRACT

An apparatus and method are provided for transferring data through a submarine hull or other solid boundary using high frequency acoustic signals, so avoiding penetration of the hull or boundary. First and second transducers are mounted on opposed surfaces of the hull and aligned to communicate acoustic signals through the hull. The first transducer is driven by a continuous wave carrier signal modulated with data. A demodulator detects that data in the modulated acoustic signals received by the second transducer. Critically, the dimensions of the first and second transducers and the frequency of the carrier signal are selected so as to reduce the interference by triple transit signals through the hull to a level sufficiently low to enable continuous communication of data through the hull at a bit rate of at least 1 MHz. Carrier signals of the order of 40 MHz may be used to achieve data bit rates of the order of 15-18 MHz through the hull.

13 Claims, 3 Drawing Sheets

U.S. PATENT DOCUMENTS

| | | | |
|---|---|---|---|
| 4,242,653 | A | 12/1980 | Moore |
| 6,037,704 | A | 3/2000 | Welle |
| 6,400,648 | B1 | 6/2002 | Heijnsdijk et al. |
| 2010/0061188 | A1 * | 3/2010 | Bagshaw et al. ............ 367/137 |

FOREIGN PATENT DOCUMENTS

| | | |
|---|---|---|
| JP | 05-252117 | 9/1993 |
| WO | WO 02/068934 | 9/2002 |
| WO | WO 2008075092 A1 * | 6/2008 |

OTHER PUBLICATIONS

E. Hobart et al. "Acoustic Modem Unit", IEEE 2000, pp. 769-772.

International Search Report, Apr. 11, 2008, from International Patent Application No. PCT/GB2007/050720.

Written Opinion of the International Searching Authority, Apr. 11, 2008, from International Patent Application No. PCT/GB2007/050720.

The International Bureau of WIPO, International Preliminary Report on Patentability, Jun. 23, 2009, from International Patent Application No. PCT/GB2007/050720.

Japan Patent Office, Office Action (English translation), Jul. 1, 2010, from related Japanese Patent Application No. JP 2008-549937.

* cited by examiner

APPARATUS AND METHOD FOR DATA TRANSFER THROUGH A SUBSTRATE

RELATED APPLICATION INFORMATION

This application is a United States National Phase patent application of, and claims the benefit of, International Patent Application No. PCT/GB2007/050720 which was filed on Nov. 27, 2007, and which claims priority to British Patent Application No. 0625559.0, which was filed on Dec. 21, 2006, and which claims priority to European Patent Application No. 06256460.4, which was filed on Dec. 21, 2006, the disclosures of all of which are incorporated herein by reference.

FIELD OF THE INVENTION

The present invention relates to data transfer and in particular, but not exclusively, to an apparatus and method for transferring high bandwidth digital signals and data through submarine hulls or other solid boundaries using acoustic techniques.

BACKGROUND INFORMATION

Various attempts have been made to provide signal communications through ship hulls without the need to penetrate the hull for the passage of cables, or other feed-throughs. Techniques used have included transmission of electrical signals or acoustic signals. In one example of an acoustic technique, described in Hobart et al., "Acoustic Modem Unit", Oceans 2000 MTS/IEEE Conference and Exhibition, pp. 769-772, vol. 2, September 2000, piezoelectric transducers were used to generate acoustic signals for carrying low bit rate data through a ship's hull, suitable for conveying environmental, e.g., sea temperature and salinity data from outside the hull without the need or the inconvenience of modifying the vessel by drilling holes in the hull. These data are typically transmitted at a low data rate, in a burst mode.

SUMMARY OF THE INVENTION

From a first aspect, the present invention resides in an apparatus for the communication of data through a solid rigid substrate, including:

a first acoustic transducer mounted on one face of the substrate;

a second acoustic transducer, mounted on a second face of the substrate, positioned to receive acoustic signals emitted by the first acoustic transducer;

energizing means for energising the first transducer with a continuous wave carrier signal modulated with data; and a demodulator for detecting data modulated in an acoustic signal detected by the second transducer, wherein the dimensions of the first and second transducers and the frequency of the carrier signal are selected so as to reduce the interference by triple transit signals through the substrate to a level sufficiently low to enable continuous communication of data through the substrate at a bit rate of at least 1 MHz.

Whereas acoustic signals may be used for the communication of digital data at a low bit rate through a solid rigid substrate without needing to penetrate the structure, it has been found that by careful choice of the size of the transducers and the frequency of the carrier signal, the effects of the triple transit signal, i.e. the third transit through the substrate of a reflected portion of a main acoustic signal, can be reduced to such a level that communication of data at rates of at least 1 MHz can be achieved.

In an exemplary embodiment of the present invention, the same technique may be applied to achieve a data bit rate of approximately 10 MHz when using a carrier signal centered in frequency on 25 MHz, or a data bit rate of approximately 18 MHz when using a carrier signal centred in frequency on 40 MHz. Carrier signals of frequencies in the range 25 MHz to 72 MHz may be used.

In particular when using carrier signals with a frequency of the order of 25 MHz and greater, the energizing means may include a radio frequency matching circuit to provide appropriate radio frequency matching for the first transducer.

In an exemplary embodiment, the first and second transducers are used alternately as transmitters and as receivers of acoustic signals in the substrate to enable bi-directional communication. However, two sets of first and second transducers may be mounted on the surface of the substrate sufficiently far apart to avoid interference of their respective acoustic signals within the substrate in order to provide a continuous bi-directional communications link through the substrate.

Exemplary embodiments of the present invention find particular application in data communication through metal structures, in particular through submarine hulls or pressurized containers.

From a second aspect, the present invention resides in a method for communicating data through a solid rigid substrate using acoustic signals transmitted through the substrate between a first acoustic transducer and a second acoustic transducer mounted on opposed surfaces of the substrate, the method including the steps of:

(i) energizing the first acoustic transducer with a continuous wave carrier signal that has been modulated with data; and (ii) detecting, at the second transducer, acoustic signals transmitted through the substrate by the first transducer and detecting data modulated therein;

wherein the dimensions of the first and second transducers and the frequency of the carrier signal are selected so as to reduce the interference by triple transit signals through the substrate to a level sufficiently low to enable continuous communication of data through the substrate at a bit rate of at least 1 MHz.

In an application of exemplary embodiments of the present invention to continuous broadband communication through a submarine hull, the choice of transducer size and carrier signal frequency is crucial to achieving broadband communications, at data bit rates of the order of 10 MHz or higher. The techniques mentioned above for non-penetrating data transfer through submarine hulls and similar metal structures operate in burst mode and at low data rates. To operate at a high data rate has hereto required penetration of the hull through complex pressure valves and feed-throughs. In a modern submarine these penetrations cost tens of thousands of pounds sterling to implement and create potential points of failure in the hull, particularly as it is subject to repeated stress cycling as the submarine submerges and resurfaces. There are typically several hundred of penetrations through a submarine hull.

Exemplary embodiments of the present invention provide for data transfer at a much higher data rate than prior art arrangements, at so-called "broadband" data rates, without penetrating the hull. In particular, data rates of the order of 15 MHz and more have been achieved by exemplary embodiments of the present invention based upon an acoustic signal centered at approximately 40 MHz. Such data rates are suitable for transmission of video data and other types of data typically associated with broadband communications. Several factors have enabled this step improvement over prior art systems.

One of the main factors limiting the bandwidth of digital communications using acoustic signals through a medium of solid materials is the presence of spurious signals, in particular acoustic reflections from interface layers within the acoustic transmission path through the medium. The most significant reflection is the triple transit signal—the first received reflection of the main signal after a total of three passes through the medium from the transmitting transducer. Digital signal communications requires a spurious free dynamic range (SFDR) with respect to the main signal of approximately 20 dB. When signals are transmitted at low bit rates, multiply reflected signals may be easily separated from the main signal. At higher bit rates separation is not so easy to achieve.

In a high bandwidth link based upon continuous data transmission, as opposed to the burst mode transmission technique used in certain prior art arrangements, the multiply reflected signals overlap each other causing interference. This problem may be overcome by design of the link such that the multipath signals are attenuated at the receive transducer at a level, relative to the main signal, of greater than the 20 dB spurious free dynamic range. This may be achieved by balancing the losses due to acoustic beam spreading and acoustic attenuation in the medium.

Whereas an arrangement including only first and second transducers is able to provide only unidirectional communication at any one time, the transducers may nevertheless be configured so that the direction of communication may be electrically switched. However, by placing pairs of transducers on either side of the substrate, e.g. of a submarine hull, the communications link may be configured to be continuously two-way; i.e. active in both directions simultaneously.

DETAILED DESCRIPTION

Exemplary embodiments of the present invention will now be described in more detail, by way of example only, with reference to the accompanying drawings.

Submarine hulls need to be able to withstand considerable stresses in use. Every penetration point in the hull is a potential point of failure. Moreover, these penetrations are expensive to manufacture and to install. Designers of other types of enclosed structure, for example of pressure vessels in nuclear reactors and high pressure pipelines, share similar concerns. There is frequently a need to be able to convey data, e.g. pressure, temperature, radiation, chemical monitoring data and video from sensors, between the inside of such an enclosed structure and the outside. A high bandwidth communications technique for transferring such data that avoids the need to physically penetrate the structure brings considerable advantages in the overall integrity and reliability of the structure.

An exemplary embodiment of the present invention, designed to provide a digital data transfer rate of approximately 15 MHz through a 36 mm steel submarine hull using acoustic signals of 40 MHz, will now be described with reference to FIG. 1.

Figure 1:
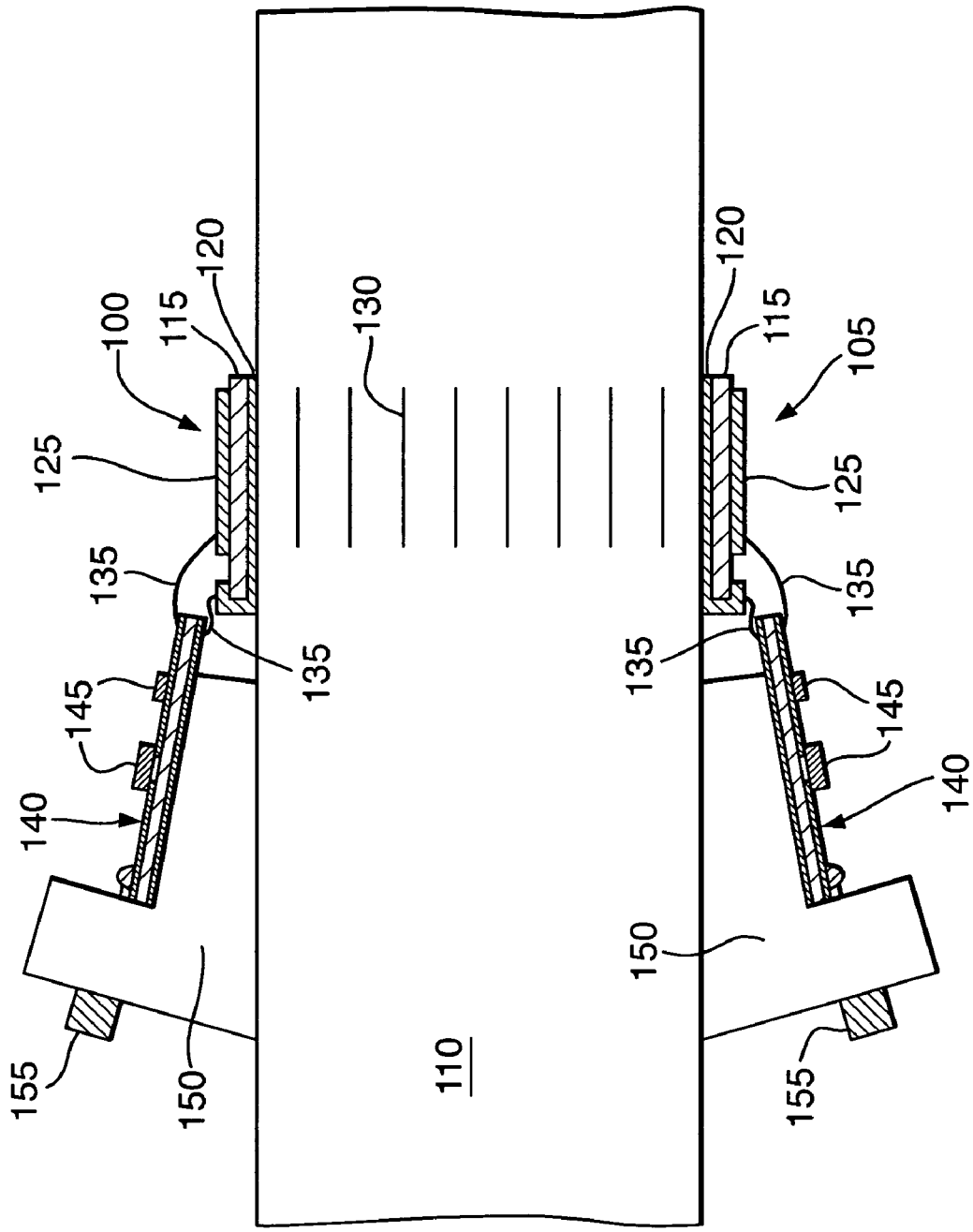
FIG. 1 shows a section of a submarine hull with transducers fitted, according to an exemplary embodiment of the present invention.

Referring to FIG. 1, piezoelectric transducers 100 and 105 are shown that have been aligned and bonded to opposed faces of a 36 mm thick steel submarine hull 110. The relative dimensions of the transducers 100, 105 and the submarine hull 110 have been exaggerated in FIG. 1 to more clearly show the structure of the transducers 100, 105. In a scale drawing, the transducers 100, 105 would appear significantly smaller and thinner in comparison with the thickness of the hull 110.

Each transducer 100, 105 includes a rectangular platelet 115 of a piezoelectric material approximately 7 mm by 9 mm and approximately 100 μm thick that has been bonded to a ground plane 120. The ground plane 120, in turn, has been bonded to the surface of the steel hull 110 by means of a bonding layer (not shown in FIG. 1). The bonding layer may be chosen to have a thickness of less than one twentieth of the wavelength of acoustic signals to be generated by the transducers 100, 105. On the basis of a calculated acoustic velocity through the steel used in submarine hulls 110 of approximately 5800 m/s, this gives a bonding layer thickness of less than 5 μm when used with 40 MHz acoustic signals.

Each transducer 100, 105 is activated by means of an electrode 125 that has an area of approximately 49 $mm^2$. The electrode 125 is located on the opposite face of the piezoelectric platelet 115 to that of the ground plane 120. Bonding wires 135 connect the ground plane 120 and the electrode 125 to a ground plane and conducting tracks respectively of a interfacing circuit board 140. The interfacing circuit board 140 carries interfacing components 145, for example inductances for an impedance matching network to be described below. The interfacing board 140 is mounted on a support member 150 which is also bonded to the surface of the hull 110 to provide a robust mounting. The support member 150 carries an electrical connector 155 which is electrically connected to the interfacing board 140.

The inventors in the present case have modelled the intensity profile of acoustic signals 130 generated by a platelet transducer 100, 105 as a function of angle away from the bore sight direction of the transducer 100, 105. Thus, they have determined that the angular alignment of the transducer platelets 115 on opposed sides of the hull 110 when using 49 $mm^2$ square electrodes 125 should be within approximately ±1° for the receiving transducer to lie within the 3 dB points of the modelled transducer response. In practice, alignment may be achieved by design with the transducers 100, 105 being positioned by geometrical measurement on each side of the hull 110 or by active alignment on each side of the hull 110 using test signals generated first by one transducer 100, 105 and then by the other.

In general, a matching network is used in conjunction with the transducer 100, 105. A matching network designed for use with the arrangement described above with reference to FIG. 1, operational at a centre frequency of 40 MHz, will now be described with reference to FIG. 2.

Figure 2:
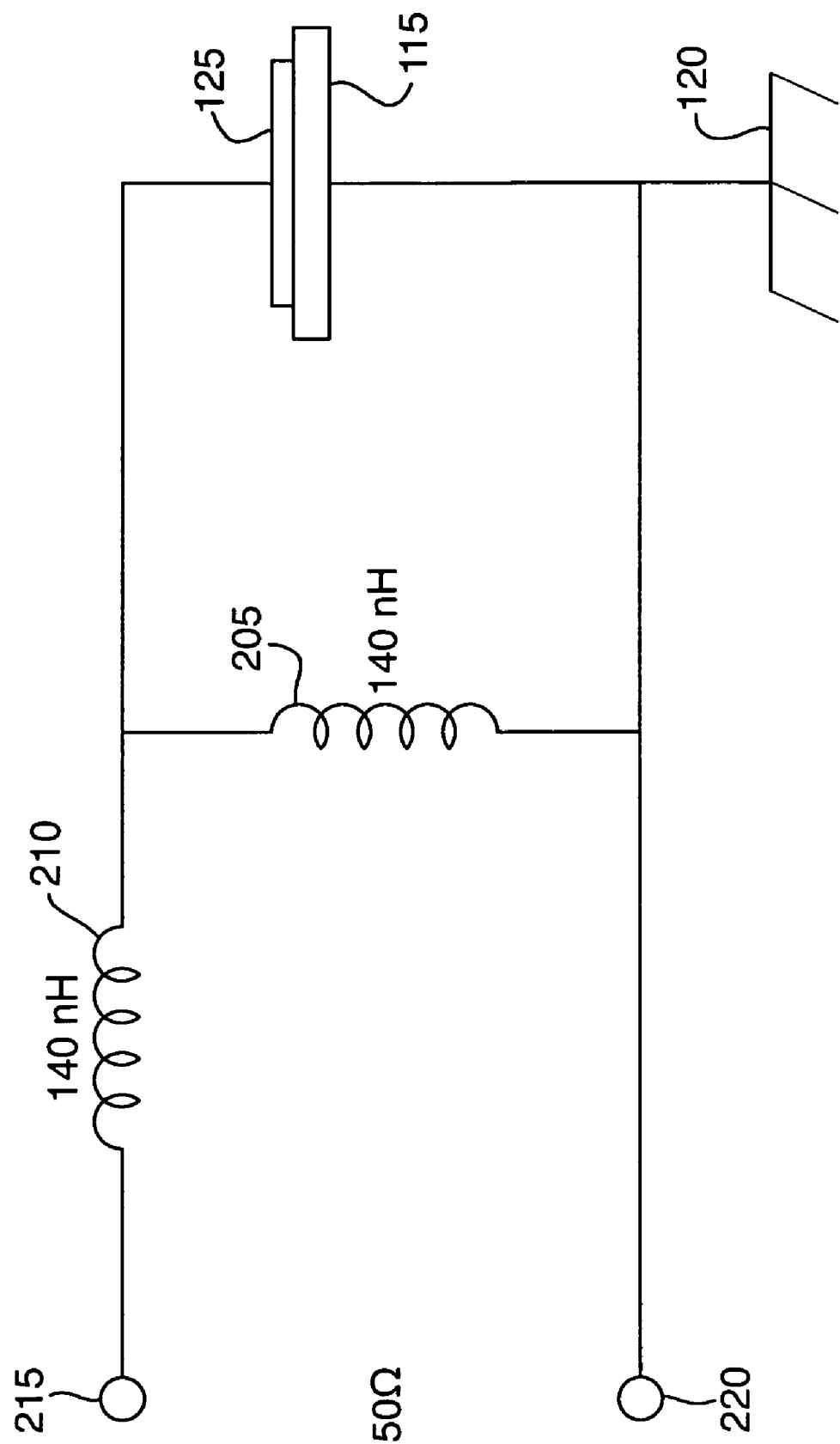
FIG. 2 is a circuit diagram for a preferred matching circuit for use in a communications system according to an exemplary embodiment of the present invention.

Referring to FIG. 2, a circuit diagram is shown for a matching network connected to a transducer of the type described above with reference to FIG. 1. Electrically, the transducer (100, 105) is effectively a capacitor in series with a radiation resistance and an electrical resistance due to the interconnection path with the transducer. The matching network includes a first inductor 205 of 140 nH for connection in parallel with the transducer between the transducer electrode 125 and the ground plane 120, and a second electrode 210, also of 140 nH, connected in series between an input 215 to the network and the electrode-side connection of the first inductor 205. The first inductor 205 is provided to tune out the majority of the capacitance in the transducer (100, 105) while at the same time increasing the impedance of the combined transducer and inductor 205. The second inductor 210 completes the tuning process over the broadband frequency range required. The matching network may be fabricated on the interfacing board 140, as shown in the arrangement in FIG. 1, while the network input 215 and a ground plane connection 220 are terminated in the connector 155.

In general, to achieve broadband performance from a transducer bonded to a substrate, the acoustic impedance of the transducer, given by the product of the density of the transducer material and acoustic velocity through it, should be as closely matched to that of the substrate as possible. This facilitates the coupling of mechanical energy in the transducer to the substrate. In a further refinement, the material selected for the transducer should have the maximum possible electro-mechanical coupling coefficient, representing the strength of coupling of supplied electrical energy into mechanical energy in the transducer. Candidate transducer materials for use in exemplary embodiments of the present invention include PZT and lithium niobate. Other materials, and other transducer configurations may also be used. It has been shown possible by the inventors in the present case to achieve fractional bandwidths of up to 50% of the operational centre frequency with appropriately selected longitudinal wave transducers applied to a substrate of submarine hull steel.

A further consideration in the design of a through-hull broadband communications link is the need to balance the losses arising from spreading of an acoustic beam as it travels through the hull material and those due to the acoustic attenuation of the material. Losses arising from spreading of the beam tend to decrease with frequency whereas losses due to attenuation tend to increase with frequency. These losses can be balanced for a particular path length by a combination of the choice of transducer size and the operational frequency of the apparatus. It is important that this is done, otherwise the acoustic data link will have a loss which is greater at one end of its operational bandwidth than at the other end, causing significant distortion of the transmitted signal.

Figure 3:
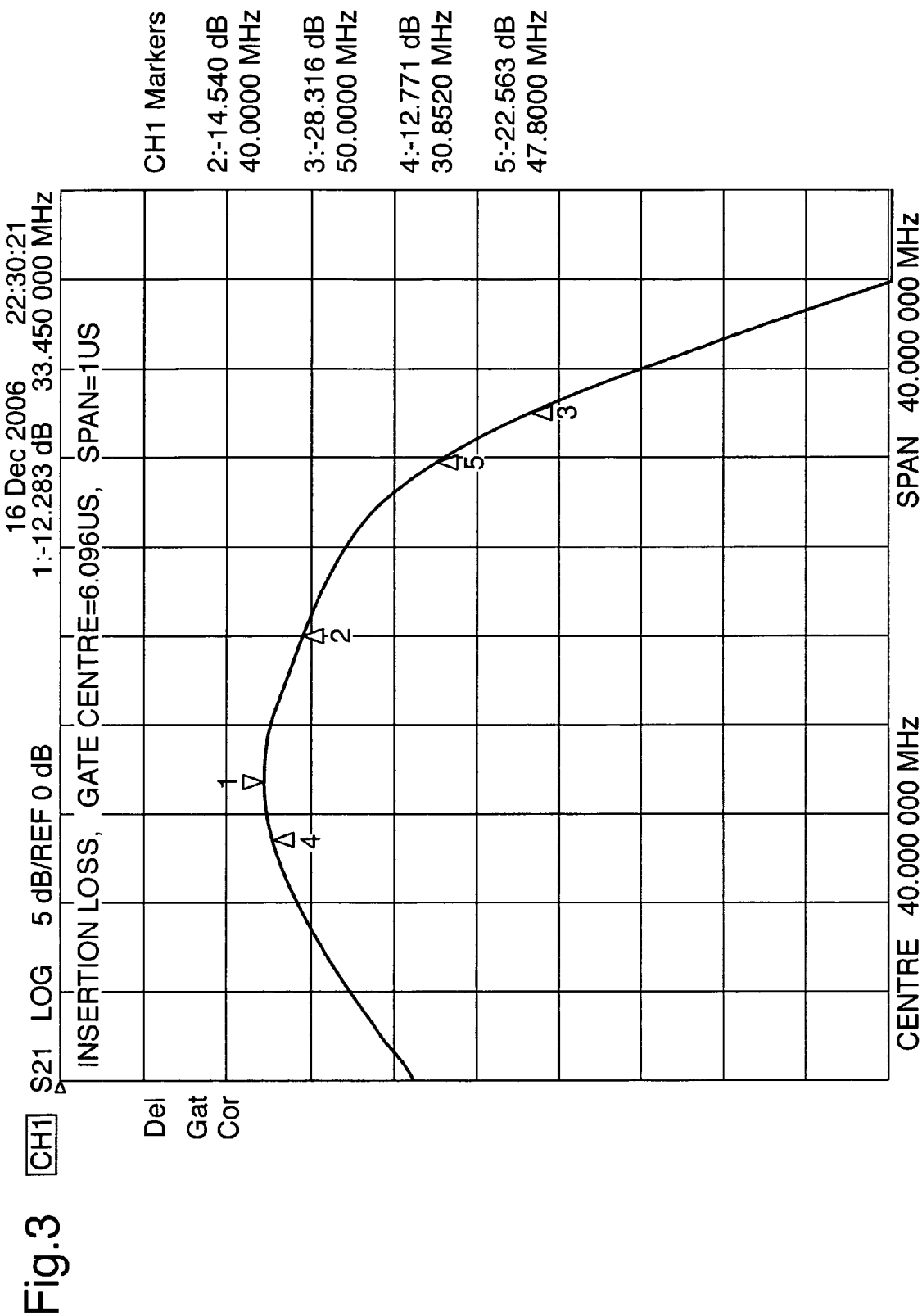
FIG. 3 is a graph showing the transmission bandshape through a submarine hull as measured for an exemplary embodiment of the present invention.

Referring to FIG. 3, a graph is provided showing the transmission band shape as measured over a frequency range from 20 MHz to 60 MHz for an exemplary embodiment of the present invention described herein.

Whereas a hull thickness of 36 mm has been used to demonstrate the operation of an exemplary embodiment of the present invention, the inventors in the present case have determined that an acoustic beam launched by an acoustic transducer 100, 105 at a frequency of 40 MHz using 49 mm$^2$ electrodes remains approximately collimated over a distance of up to 150 mm. This allows for the application of exemplary embodiments of the present invention to thicker structures than the submarine hull of the demonstration.

In practice, the electrode size is determined by a combination of the acoustic path (larger transducers are easier to align), the operational frequency and the ease of impedance matching.

Unlike conventional transducers, any transducer mounted on the external surface of a submarine will be hydrostatically loaded and would be protected from seawater by either potting it in an appropriate plastic coating, or for example an oil within a deformable cover. The impact of oil loading on the rear surface of lithium niobate transducer has been considered. Using reasonable estimates for the density of oil and the velocity of sound in oil, it has been found that very little acoustic power, less than 0.2 dB of the total available, is likely to be coupled into the oil loading because of the significant acoustic impedance mismatch between the piezoelectric platelet 115 and the oil. The transducer and associated electronics may be mounted on the exterior surface of a submarine in a way compatible with deep sea operations.

This technique of non-penetrating high frequency data communications according to exemplary embodiments of the present invention is equally applicable to many other structures including nuclear reactors and high pressure pipelines. The advantage of this technique over other more conventional techniques used with those structures is that it reduces the necessity for drilling holes, each of which is a potential failure point through either a stress fracture or chemical corrosion. One difference between the various applications of the present invention lies in the degree of environmental protection applied to each transducer structure.

In an application of the present invention when applied to submarine hulls, underwater communication points may be provided at various places over the outside of the hull to enable, e.g. short range RF or optical communication between external vehicles or divers in the water outside the submarine and equipment or people inside it. For example, a transponder may be linked to the through-hull communications link as provided by the present invention to enable remote control of an underwater vehicle from within the submarine or to download data gathered by the underwater vehicle when it moves to within communicating range of the transponder. The broadband nature of the connection through the hull provided by the present invention seems particularly attractive in its ability to rapidly download or exchange significant quantities of data with a remote vehicle or diver or an underwater beacon in a very short time.

The invention claimed is:

1. An apparatus for the communication of data through a solid rigid substrate, comprising:
    a first acoustic transducer mounted on one face of the substrate;
    a second acoustic transducer, mounted on a second face of the substrate, positioned to receive acoustic signals emitted by the first acoustic transducer;
    an energizing arrangement configured to energize the first transducer with a continuous wave carrier signal modulated with data; and
    a demodulator for detecting data modulated in an acoustic signal detected by the second transducer;
    wherein the dimensions of the first and second transducers and the frequency of the carrier signal are selected so as to reduce the interference by triple transit signals through the substrate to a level sufficiently low to enable continuous communication of data through the substrate at a bit rate of at least 1 MHz.

2. The apparatus of claim 1, wherein the energizing arrangement is configured to generate a continuous wave carrier signal of between 25 MHz and 72 MHz.

3. The apparatus of claim 2, wherein the data communication bit rate is at least 10 MHz.

4. The apparatus of claim 1, wherein the energizing arrangement includes a radio frequency matching circuit for the first transducer.

5. The apparatus of claim 1, wherein the substrate is a portion of a metal structure.

6. The apparatus of claim 5, wherein the metal structure is a steel submarine hull.

7. The apparatus of claim 5, wherein the metal structure is a pressurized container.

8. A method for communicating data through a solid rigid substrate using acoustic signals transmitted through the substrate between a first acoustic transducer and a second acoustic transducer mounted on opposed surfaces of the substrate, the method comprising:
  (i) energizing the first acoustic transducer with a continuous wave carrier signal that has been modulated with data; and
  (ii) detecting, at the second transducer, acoustic signals transmitted through the substrate by the first transducer and detecting data modulated therein;
  wherein the dimensions of the first and second transducers and the frequency of the carrier signal are selected so as to reduce the interference by triple transit signals through the substrate to a level sufficiently low to enable continuous communication of data through the substrate at a bit rate of at least 1 MHz.

9. An apparatus for the communication of data through a solid rigid substrate, comprising:
  a first acoustic transducer mounted on one face of the substrate;
  a second acoustic transducer, mounted on a second face of the substrate, positioned to receive acoustic signals emitted by the first acoustic transducer;
  an energizing arrangement configured to energize the first transducer with a continuous wave carrier signal modulated with data; and
  a demodulator to detect data modulated in an acoustic signal detected by the second transducer;
  wherein dimensions of the first transducer and the second transducer and a carrier signal frequency are selected so as to attenuate triple transit signals by at least approximately 20 db relative to the main signal.

10. An apparatus for the communication of data through a solid rigid substrate, comprising:
  a first acoustic transducer mounted on one face of the substrate;
  a second acoustic transducer, mounted on a second face of the substrate, positioned to receive acoustic signals emitted by the first acoustic transducer;
  an energizing arrangement configured to energize the first transducer with a continuous wave carrier signal modulated with data; and
  a demodulator for detecting data modulated in an acoustic signal detected by the second transducer;
  wherein dimensions of the first transducer and the second transducer and a carrier signal frequency are selected so that loss of signal strength due to spreading of the signal and loss of signal strength due to the acoustic attenuation of the substrate are approximately equal for a given acoustic path length.

11. The apparatus of claim 1, wherein the energizing arrangement is configured to generate a continuous wave carrier signal of between 25 MHz and 72 MHz, wherein the data communication bit rate is at least 10 MHz, and wherein the energizing arrangement includes a radio frequency matching circuit for the first transducer.

12. The apparatus of claim 11, wherein the substrate is a portion of a metal structure, and wherein the metal structure is a steel submarine hull.

13. The apparatus of claim 11, wherein the substrate is a portion of a metal structure, and wherein the metal structure is a pressurized container.

* * * * *